(12) United States Patent
Goose et al.

(10) Patent No.: US 8,279,254 B2
(45) Date of Patent: Oct. 2, 2012

(54) METHOD AND SYSTEM FOR VIDEO CONFERENCING IN A VIRTUAL ENVIRONMENT

(75) Inventors: Stuart Goose, Berkeley, CA (US); Jinhui Hu, Albany, CA (US); Mark Sher, San Francisco, CA (US); Michael Wynblatt, West Bloomfield, MI (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1023 days.

(21) Appl. No.: 12/182,019

(22) Filed: Jul. 29, 2008

(65) Prior Publication Data
US 2009/0033737 A1    Feb. 5, 2009

Related U.S. Application Data

(60) Provisional application No. 60/963,212, filed on Aug. 2, 2007, provisional application No. 61/079,184, filed on Jul. 9, 2008.

(51) Int. Cl.
*H04M 11/00* (2006.01)
(52) U.S. Cl. .................. 348/14.01; 455/556.1
(58) Field of Classification Search .... 348/14.01–14.08; 709/204; 455/556.1
See application file for complete search history.

(56) References Cited

U.S. PATENT DOCUMENTS

| 5,999,208 | A | 12/1999 | McNerney et al. |
| 6,119,147 | A | 9/2000 | Toomey et al. |
| 6,230,171 | B1 * | 5/2001 | Pacifici et al. ................. 715/201 |
| 7,227,567 | B1 * | 6/2007 | Beck et al. ................. 348/14.07 |
| 2002/0018070 | A1 | 2/2002 | Lanier |
| 2004/0189701 | A1 | 9/2004 | Badt |
| 2006/0268101 | A1 * | 11/2006 | He et al. ..................... 348/14.12 |
| 2007/0279483 | A1 * | 12/2007 | Beers et al. ................ 348/14.08 |
| 2007/0279484 | A1 * | 12/2007 | Derocher et al. .......... 348/14.09 |
| 2008/0068443 | A1 * | 3/2008 | Thielman et al. ............ 348/14.1 |
| 2008/0300010 | A1 * | 12/2008 | Border et al. .............. 455/556.1 |
| 2009/0195638 | A1 * | 8/2009 | Caspi et al. ................ 348/14.09 |

FOREIGN PATENT DOCUMENTS
EP    1 094 657    4/2001

* cited by examiner

*Primary Examiner* — Curtis Kuntz
*Assistant Examiner* — Maria El-Zoobi (57) ABSTRACT

According to some embodiments, a method and a system are provided to receive a first video signal at a first client and to receive a second video signal at a second client. The first video signal comprises an image of a first person and the second video signal comprises an image of a second person. The received first video signal and an image of a conference room are combined at the first client to create a first modified video signal comprising the image of the first person in the conference room. The received second video signal and the image of the conference room are combined at the second client to create a second modified video signal comprising the image of the second person in the conference room.

6 Claims, 13 Drawing Sheets

601 Receive a first video signal at a first client via a network, the first video signal comprising an image of a first person

602 Receive an image of a conference room and a location of a second client from a session manager

603 Receive a second video signal at the first client via a local video camera, the second video signal includes an image of a second person and a live background

604 Subtract a live background from the second video signal at the first client

605 Transmit the second video signal comprising the image of the second person and not comprising the live background to the second client

606 Combine the received first video signal, and the image of the conference room to create a modified video signal comprising the image of the first person in the conference room

607 Display the modified video signal at the first client

METHOD AND SYSTEM FOR VIDEO CONFERENCING IN A VIRTUAL ENVIRONMENT

CROSS-REFERENCE TO RELATED APPLICATIONS

This application claims priority under 35 U.S.C. §119 to U.S. Provisional Patent Application Ser. No. 60/963,212, entitled "3-D Model Video Conference", filed on Aug. 2, 2007, and U.S. Provisional Patent Application Ser. No. 61/079,184, entitled "Integrated Video and Document Conferencing in a Virtual Environment", filed on Jul. 9, 2008, the contents of which are hereby incorporated by reference in their entirety for all purposes.

TECHNICAL FIELD

The present disclosure relates to a video conferencing system.

BACKGROUND

Participants in face-to-face meetings benefit from paralinguistic cues, such as expression, and gesturing, that facilitate communication between humans. Conventional video conferencing systems provide video images and audio of meeting participants, but attenuate or fail to capture these cues. The quality of the resulting communication invariably suffers.

Figure 1:
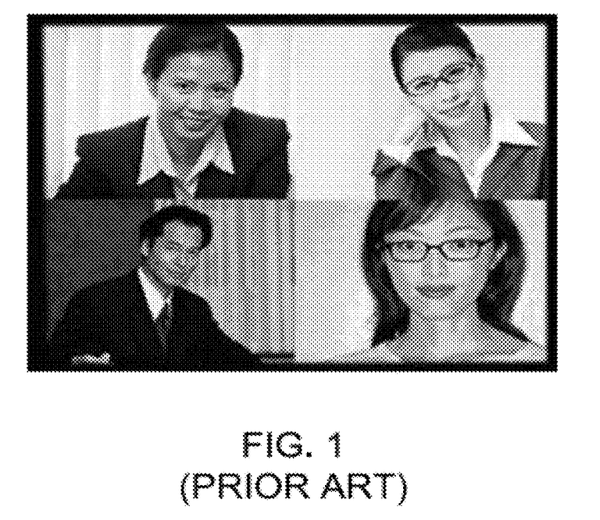
FIG. 1 illustrates a conventional videoconferencing system.

Some conventional video conferencing systems employ a video "grid" approach as illustrated in FIG. 1. While this approach enables each participant to see each other participant, it also suffers from a number of drawbacks. The video grid is an unnatural visual arrangement for a meeting. The video grid also accentuates the fact that the participants are physically and geographically distributed, rather than attempting to minimize this effect. Furthermore, the video grid does not allow the direction of eye contact and gestures toward another participant, but instead broadcasts such gestures to all participants.

Figure 2:
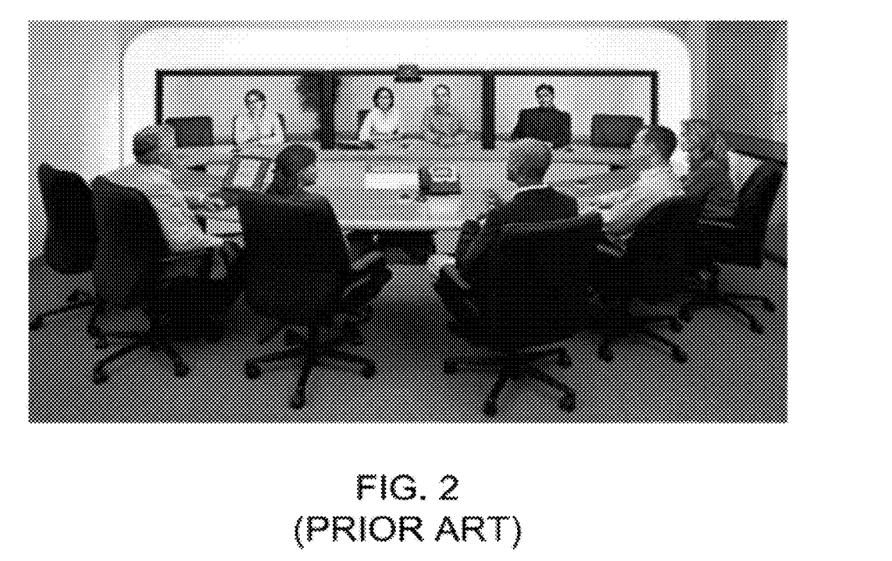
FIG. 2 illustrates a conventional videoconferencing system.

FIG. 2 illustrates an expensive dedicated room-based video conferencing system that attempts to emulate a face-to-face table style meeting. Such room-based systems require similarly-configured rooms at all participating locations including multiple high-end cameras, flat panel displays, and speakers, and require high bandwidth connectivity between the locations.

A recent trend in remote conferencing is to have each conference participant control an animated avatar that represents the participant at a specific location in a 3-dimensional virtual world. While these virtual environments offer several advantages such as freedom from physical constraints, and the perception of meeting in a same location, such virtual environments suffer from a number of disadvantages such as failing to provide a capability for each participant to see each other participant's facial expressions, reactions, gestures, enthusiasm, interest or lack of interest, etc.

SUMMARY

A method and a system may be provided to receive a first video signal at a first client and to receive a second video signal at a second client. The first video signal comprises an image of a first person and the second video signal comprises an image of a second person. The received first video signal and an image of a conference room are combined at the first client to create a first modified video signal comprising the image of the first person in the conference room. The received second video signal and the image of the conference room are combined at the second client to create a second modified video signal comprising the image of the second person in the conference room.

The claims are not limited to the disclosed embodiments, however, as those in the art can readily adapt the description herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts.

DETAILED DESCRIPTION OF SPECIFIC EMBODIMENTS

The following description is provided to enable any person in the art to make and use the described embodiments and sets forth the best mode contemplated by for carrying out the described embodiments. Various modifications, however, will remain readily apparent to those in the art.

Figure 3:
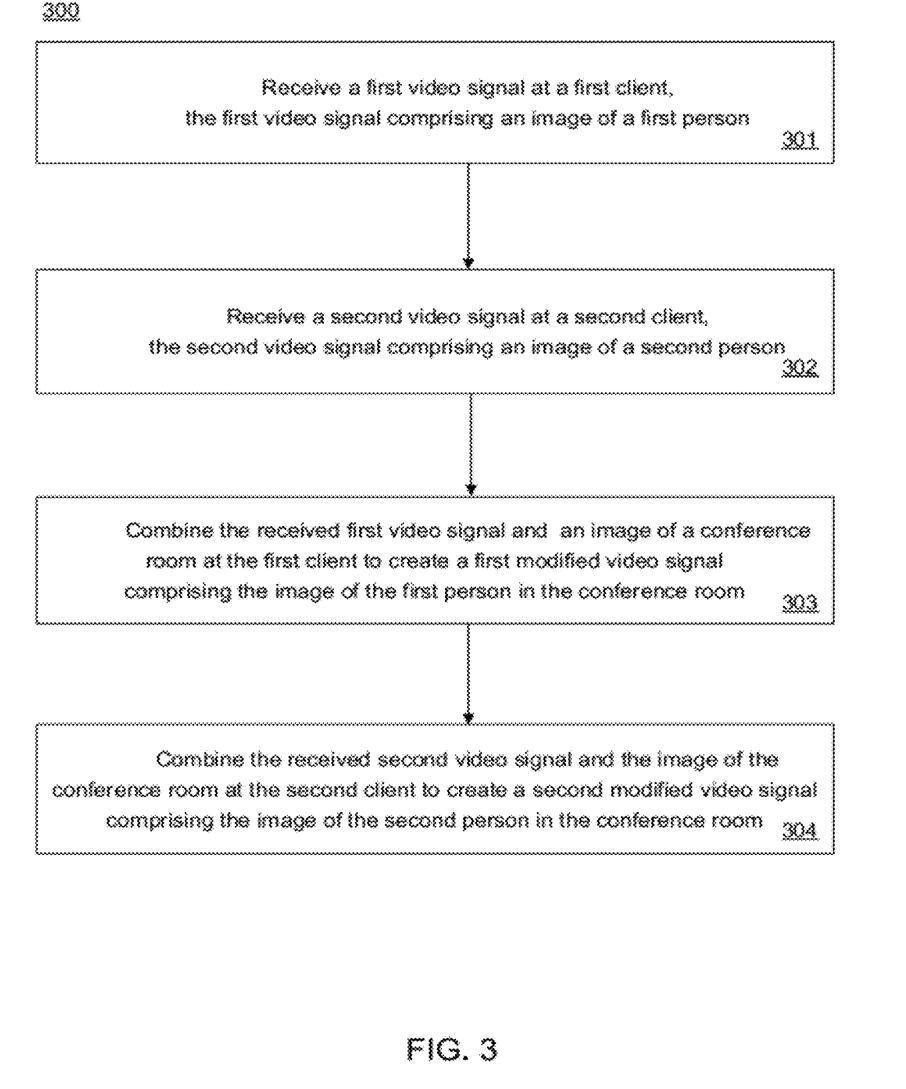
FIG. 3 is a flow diagram of a process according to some embodiments.

FIG. 3 illustrates an embodiment of a method 300. The method 300 may be executed by a system such as, but not limited to, system 400 of FIG. 4 or system 500 of FIG. 5, which will each be described later in further detail. The method 300 is not limited to the order shown in FIG. 3. Rather, embodiments of the method 300 may be performed in any order that is practicable. For that matter, and unless stated otherwise, any method disclosed herein may be performed in any order that is practicable.

At 301, a first video signal is received at a first client. The first video signal comprises an image of a first person. The first video signal may comprise a representation of individual image frames over time in any decodable format. The image frames include at least an image of the first person. The first client may comprise any device capable of performing the functions described herein.

Figure 4:
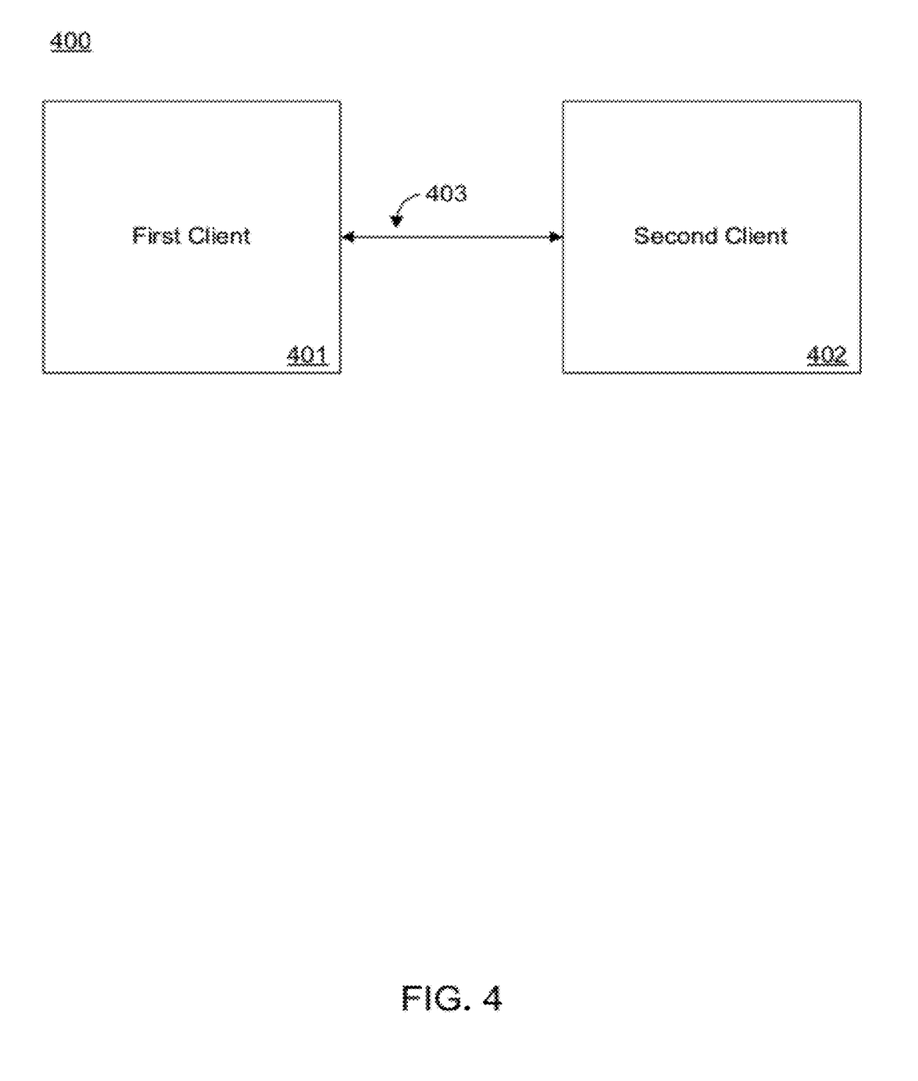
FIG. 4 is a block diagram of a system according to some embodiments.

System 400 of FIG. 4 includes a first client device 401 and a second client device 402 that perform process 300 according to some embodiments. In some embodiments, each client 401/402 may comprise a device including a video camera, a microphone, a speaker, a display, a processor, memory, and a storage medium.

Clients 401/402 are connected to a network 403 such as, but not limited to, a broadband network or a baseband network. The network 403 may comprise or include a wired network (e.g., conductors, fiber optic cables) and/or a wireless network (e.g., acoustic links, electromagnetic links or any combination thereof including, for example, but not limited to microwave links, satellite links, infrared links), and/or any combinations thereof. The network may be or include a public network or a private network, dedicated and/or shared and/or any combination thereof. The network may support any type of information in any form, for example, but not limited to, analog and/or digital information. The information may or may not be divided into blocks. If divided into blocks, the amount of information in a block may be predetermined or determined dynamically, and/or may be fixed or variable. The network may employ a protocol or combination of protocols including, for example, but not limited to an Internet Protocol.

Each client 401/402 may comprise video conferencing software that may include, but is not limited to, instructions that are storable and/or stored on a computer readable medium, such as, for example, punch cards, paper tape, magnetic or optical disk, magnetic or optical tape, CD-ROM, DVD, RAM, EPROM, or ROM. The instructions, when executed by a processor, may perform a method such as, but not limited to, method 300 of FIG. 3.

Accordingly, in some embodiments, the first client 401 receives the first video signal from the network 403 at 301. The first video signal may be generated by the second client 402, but some embodiments are not necessarily limited thereto.

Next, at 302, a second video signal is received at a second client. The second video signal comprises an image of a second person. The second client may comprise any device capable of performing the functions described herein, and the second video signal may comprise a second representation of individual image frames over time in any decodable format. Again, the image frames include at least an image of the second person.

Returning to FIG. 3, the second client 402 may receive the second video signal from the network 403 at 302. The first video signal may be generated by the second client 402, but some embodiments are not necessarily limited thereto. Accordingly, in some embodiments, the first client 401 generates the second video signal received by the second client 402, and the second client 402 generates the first video signal received by the first client 401. Moreover, the image of the first person is an image of a user of the second client 402 and the image of the second person is an image of a user of the first client 401.

At 303, the received first video signal and an image of a conference room are combined at the first client to create a first modified video signal comprising the image of the first person in the conference room. For example, and now referring to FIG. 5, an embodiment of an image of conference room is shown. The image of the conference room may comprise an image of an actual location or a computer generated image (i.e., a virtual conference room). However, in some embodiments the image of the conference room may comprise an image of a location other than a conventional looking conference room. For example, the image of the conference room may comprise an image of a pub, a beach, an airplane, an automobile, or any other location where humans may gather or be seen to gather.

Figure 6:
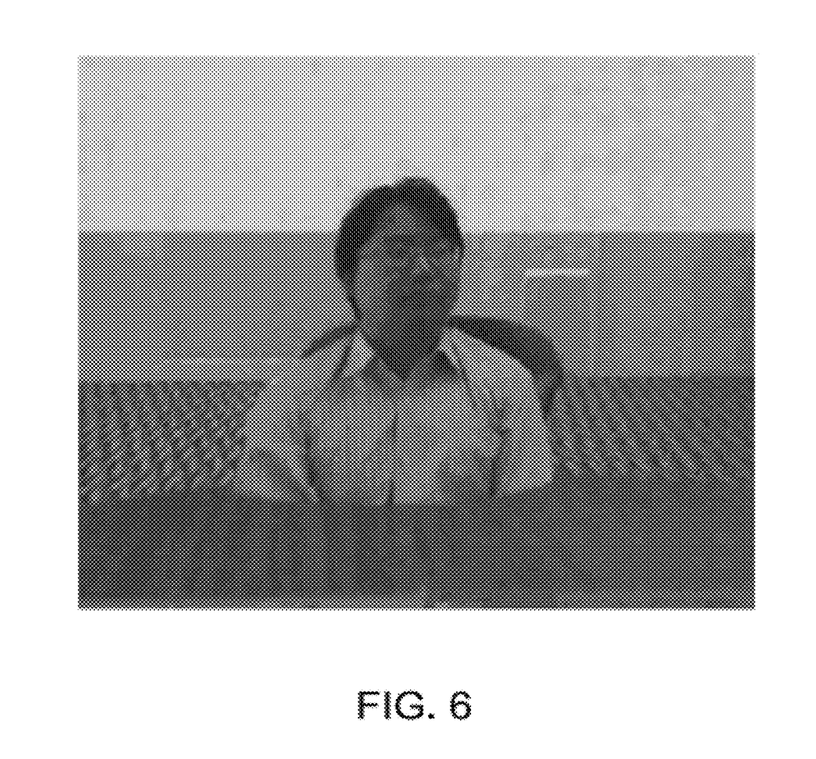
FIG. 6 illustrates a virtual conference room according to some embodiments.

FIG. 6 illustrates a first modified video signal in which the first video signal is combined with the image of the conference room according to some embodiments of 303. In the present example, the image of the first person is placed in front of a chair within the image of the conference room, which creates a realistic view of a conference within the conference room.

Referring back to FIG. 3, at 304, the received second video signal and the image of the conference room are combined at the second client to create a second modified video signal comprising the image of the second person in the conference room. The second modified video signal may also reflect FIG. 6, except including the image of the second person along with the image of the conference room.

As depicted in FIG. 6, the first modified video signal may be associated with a first perspective within the conference room. Similarly, the second modified video signal may be associated with a second perspective within the conference room. For example, the first perspective may comprise the second person's perspective view as if the second person was sitting in the conference room, and the second perspective may comprise the first person's perspective view as if the first person was sitting in the conference room.

Figure 7:
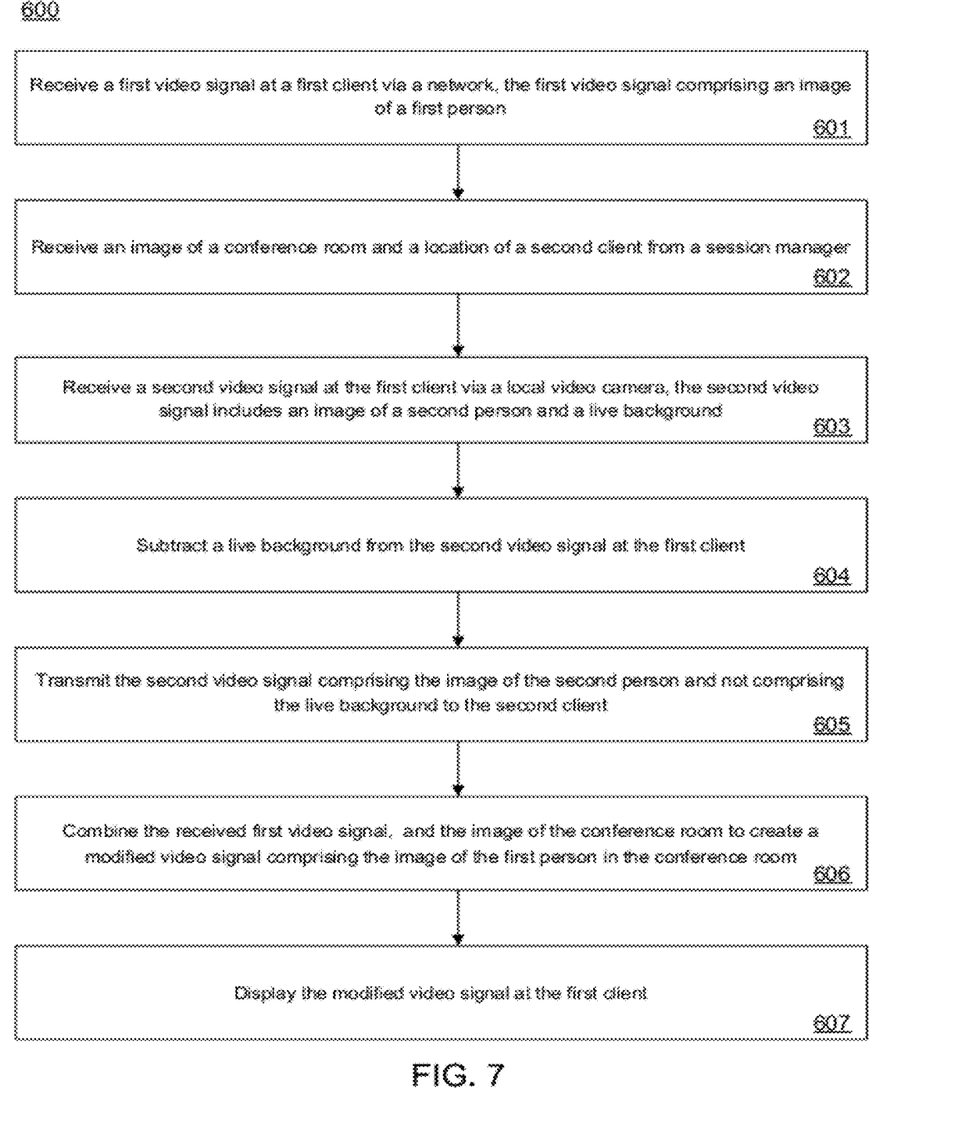
FIG. 7 is a flow diagram of a process according to some embodiments.
Figure 8:
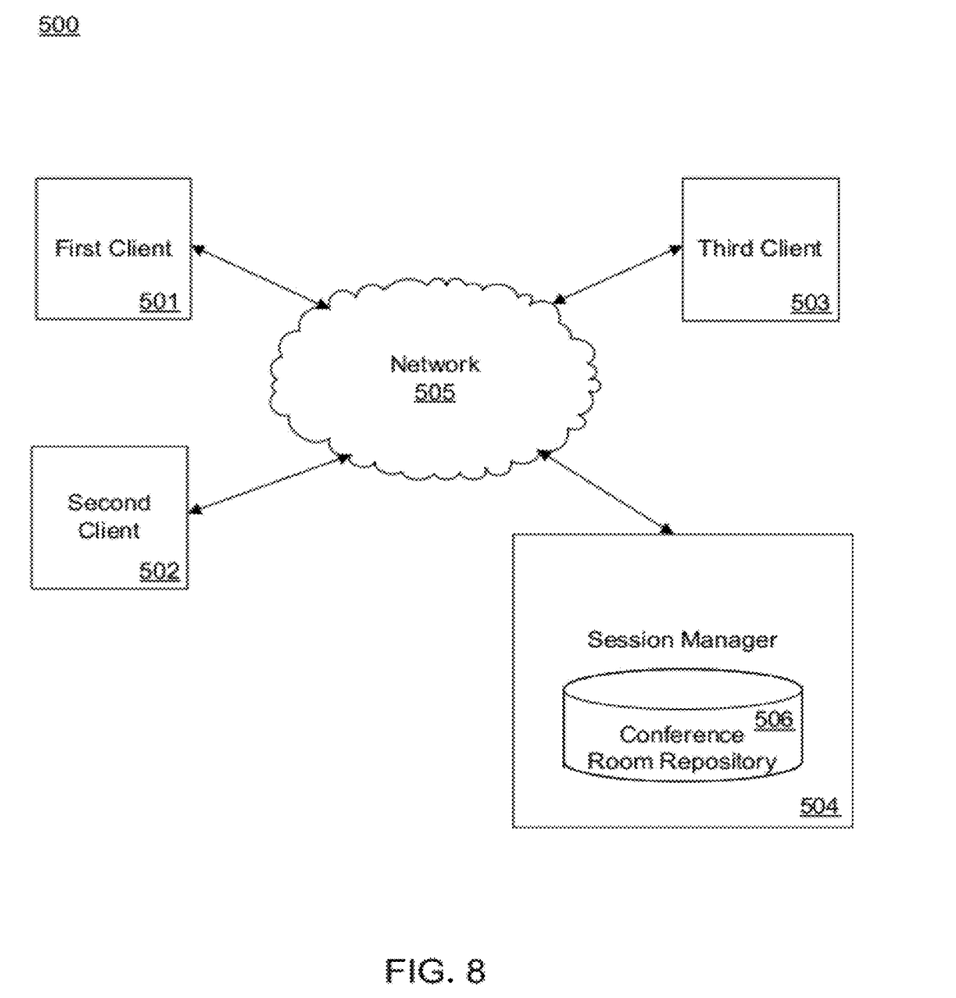
FIG. 8 is a block diagram of a system according to some embodiments.

Now referring to FIG. 7, an embodiment of a system 500 is illustrated. The system 500 may comprise a first client 501, a second client 502, a third client 503, a session manager 504, and a network 505. The first client 501 and the second client 502 may comprise embodiments of clients 401 and 402 of FIG. 4. Likewise, the third client 503 may be similar to client 401 or 402, and the network 505 may be similar to the network 403 of FIG. 4.

The session manager 504 may comprise a computer or a server in communication with the network 505. However in some embodiments, the session manager may comprise the first client 501, the second client 502, or the third client 503. The session manager 504 may manage video conferencing software that is executed on each of the clients 501/502/503 via the network. In some embodiments, the session manager 504 may communicate with each of clients 501/502/503 via an open source application layer overlay network (i.e., Spines). The session manager 504 may provide a rendezvous point for each client 501/502/503 to connect in order for each client 501/502/503 to gather specific session and participant connection data. In some embodiments, the participant connection data may comprise a location of each client 501/502/503 such as, but not limited to, an Internet protocol address or a medium access control address.

In addition, the session manager 504 may comprises a central repository such as conference room repository 506 from which images of conference rooms and/or conference room designs may be downloaded. Conference room images may comprise graphics files as known in the art (e.g., TIFF, JPEG, GIF) or, in some embodiments, conference room images may comprise code to be executed at a client to display a specific conference room image. In some embodiments, the conference room repository 506 may comprise an independent database server but in some embodiments the conference room repository 506 may be integral to the session manager 504.

FIG. 7 illustrates method 600 according to some embodiments. The method 600 may be executed by a system such as, but not limited to, systems 400 or 500.

At 601, a first video signal is received at a first client via a network, the first video signal comprising an image of a first person. For illustrative purposes only, an example will now be introduced. The example is not intended to limit the scope of the present application.

For example, the first client 501 of system 500 may comprise a laptop computer. The laptop computer may be operated by a first video conference participant located at a coffee shop, and may be connected to the internet via a wireless connection. The laptop may include a built-in video camera and a microphone. Via the wireless connection, the laptop may receive a first video signal including an image of a second video conference participant at 601.

Figure 5:
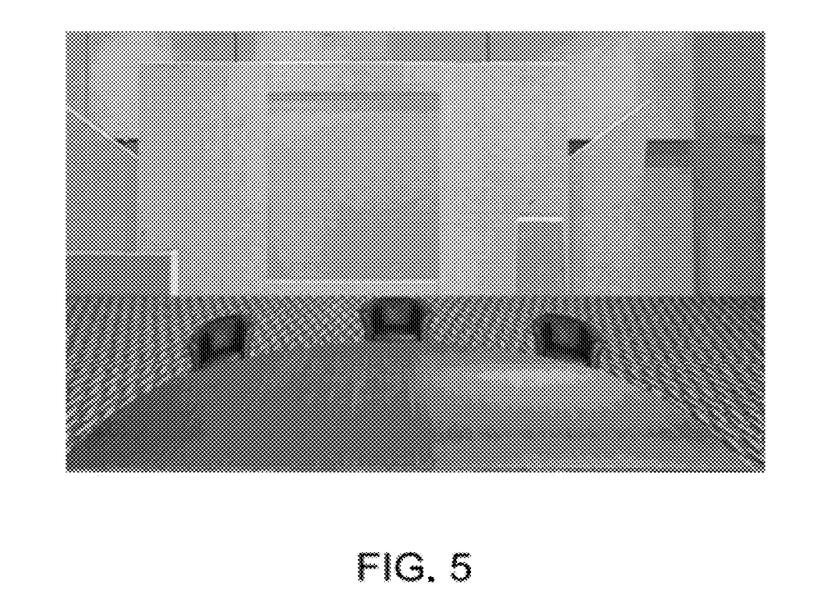
FIG. 5 illustrates a virtual conference room according to some embodiments.

An image of a conference room and a location of a second client may be received from a session manager at 602. Continuing with the above example, the first video conference participant's laptop may receive an image of a conference room from session manager 504. FIG. 5 illustrates an image of a conference room that may be received by the laptop in the present example. The laptop may further receive an IP address of the second video conference participant's client from session manager 504 at 602.

At 603, a second video signal is received at the first client via a local video camera, where the second video signal includes an image of a second person and a live background. In this regard, the first video conference participant's laptop may receive a video signal from the laptop's video camera. The laptop's video camera video signal may include an image of the first video participant as well as a live background including elements of the coffee shop.

Since certain backgrounds may be inappropriate, or undesired, for a video conference, the live background is subtracted from the second video signal at the first client at 604. In some embodiments, the live background may be replaced with a solid colored background and the solid colored background may be replaced with a transparent background as will be described in more detail with respect to FIG. 16.

Next, at 605, the second video signal comprising the image of the second person and not comprising the live background may be transmitted to the second client. Accordingly, the second video signal comprising the image of the second person and not comprising the live background may be received at a second client via the network.

Continuing with the above example, the first video participant's laptop may transmit the second video signal including an image of the first video conference participant without the coffee shop background to second client 502. Second client 502 may be operated by the second video conference participant whose image was included in the first video signal received at 601.

At 606, the received first video signal and the image of the conference room are combined to create a modified video signal comprising the image of the first person in the conference room. The modified video signal is displayed at the first client at 607.

FIG. 6 illustrates the modified video signal as displayed by first client 501 in some embodiments. As shown, the modified video signal includes an image of the first person (i.e., the second video conference participant) and the image of the conference room.

Figure 9:
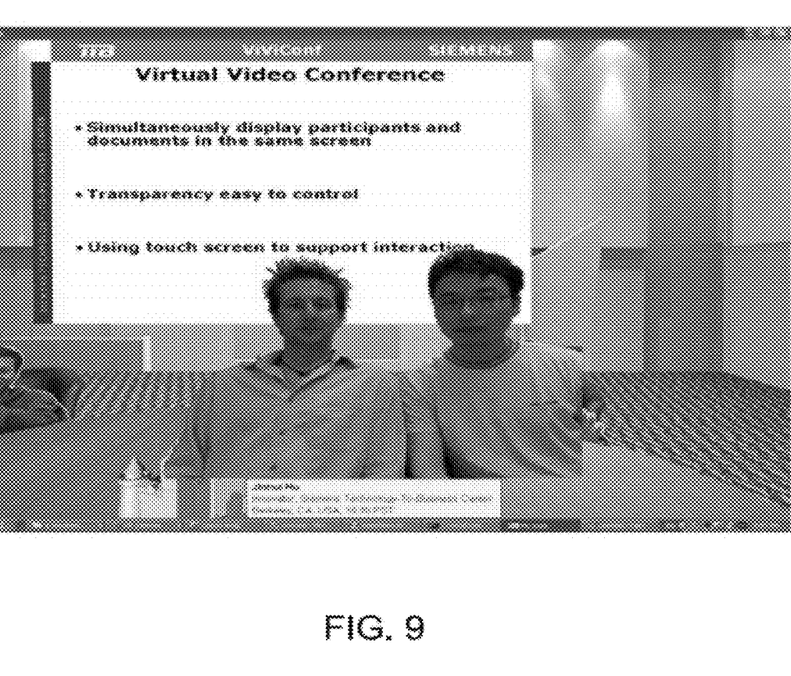
FIG. 9 illustrates a virtual conference room according to some embodiments.

In some embodiments, the image of the first person received at 601 may include an image of a third person. Accordingly, the modified video signal includes the image of the first person and the image of the third person. FIG. 9 illustrates display of such a modified video signal according to some embodiments.

Figure 10:
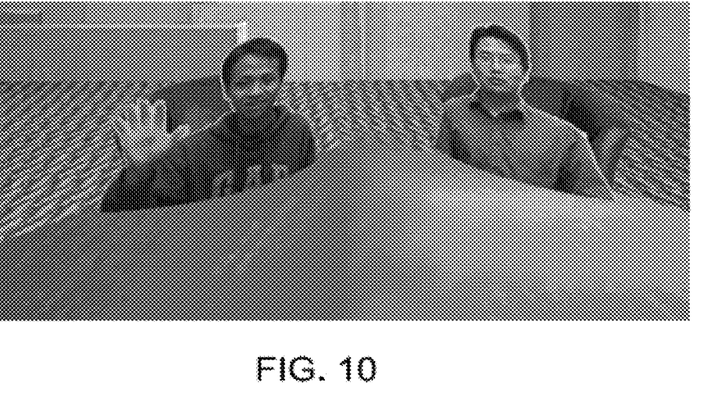
FIG. 10 illustrates a virtual conference room according to some embodiments.

According to some embodiments, the first client may further receive a third video signal comprising an image of a third person. The third video signal may be received from third client 503 operated by the third person. The received first video signal, the received third video signal and the image of a conference room may therefore be combined at the first client to create a second modified video signal comprising both an image of the first person and an image of the third person in the conference room. Consequently, and now referring to FIG. 10, a display of the second modified video signal may include images of two remotely-located video conference participants sitting at a conference room table.

In some embodiments, the first modified video signal may be modified to change a perspective associated with the first modified video signal. For example, the first modified video may be changed to comprise an image of the third person and to not comprise an image of the second person (i.e., the first person is looking at the third person and not the second person).

In some embodiments, an audio signal may be associated with each image of a person in the modified video signal and each audio signal may be modified via a spatialized audio process. The spatialized audio process recreates a corresponding position in a 3D audio space via stereo speakers or headphones associated with an audio output. For example, multiple participants may comprise mono audio emitters and each mono audio emitter is mixed into a rich stereo output to create a spatial perception.

Figure 11:
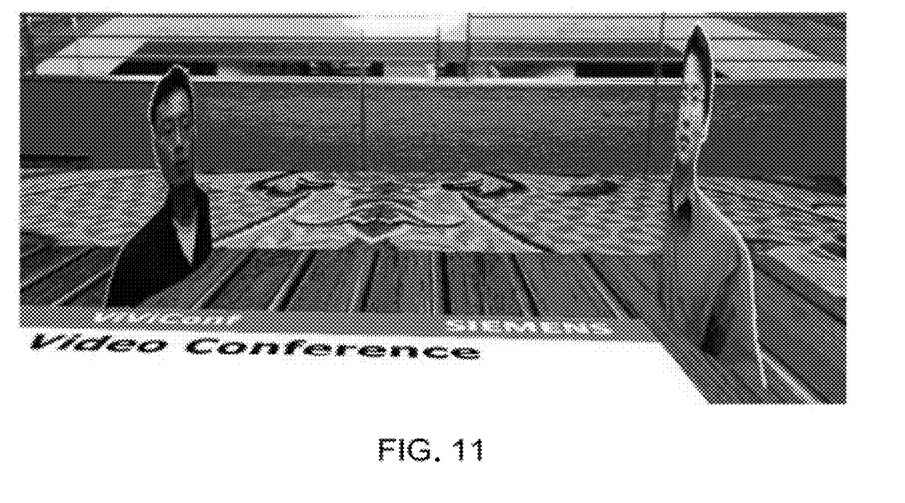
FIG. 11 illustrates a feature of a system according to some embodiments.

FIGS. 11 through 14 illustrate features of a modified video signal according to some embodiments. In conventional non-video conferences (i.e., face-to-face meetings), meeting participants commonly turn to face the current speaker. As illustrated in FIG. 11, an image of a first person in a modified video signal may be pivoted through a horizontal plane in order to turn in a direction of other participant images during a video conference. Some embodiments of the FIG. 11 features may allow a first participant and a second participant to have a more realistic interaction than provided by conventional video conferencing systems, and may allow other participants to observe that the first participant and the second participant are talking directly to each other. In some embodiments, the first client may comprise a pivoting control (i.e., a mouse, keypad, etc.) so that rotation of the video signal may be accomplished manually and, in some embodiments, a pivoting control may be automated through the use of a head tracking mechanism, or via a vision tracking algorithm or sensors.

Figure 12:
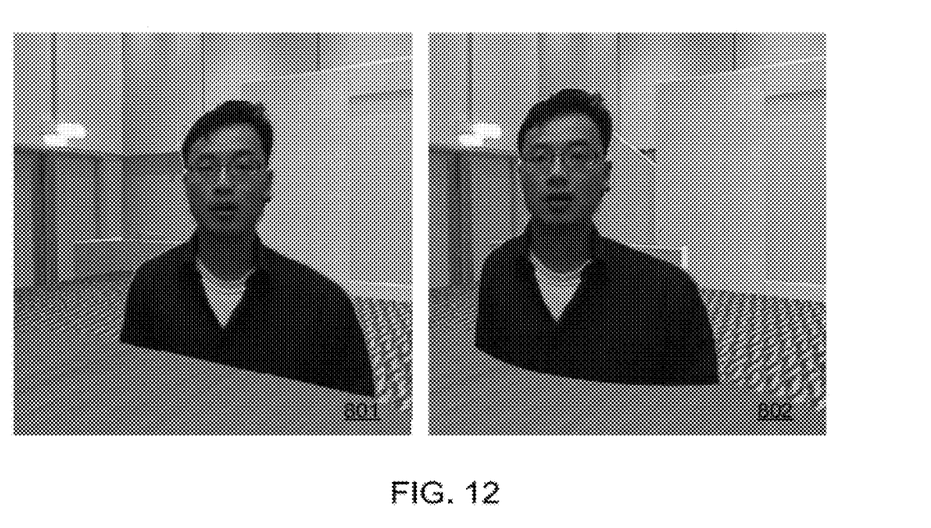
FIG. 12 illustrates a feature of a system according to some embodiments.

Embodiments of a modified video signal are illustrated in FIG. 12. Specifically, an image of a video conference participant may be combined with a conference room image as a flat image 801 or as a curved (i.e., convex) image 802. A curved image may provide a more realistic appearance than a flat image. The curved image may comprise a partial cylindrical surface since a shape of a human head is roughly cylindrical.

During creation of such a modified image signal, and in some embodiments, a cylindrical surface may be divided into a plurality of segments along a latitude direction. The plurality of segments may be sorted according to a respective depth from an eye view point, and the plurality of segments may be rendered in a descending order. In some embodiments, the order of rendering may be updated whenever the viewpoint is changed.

Figure 13:
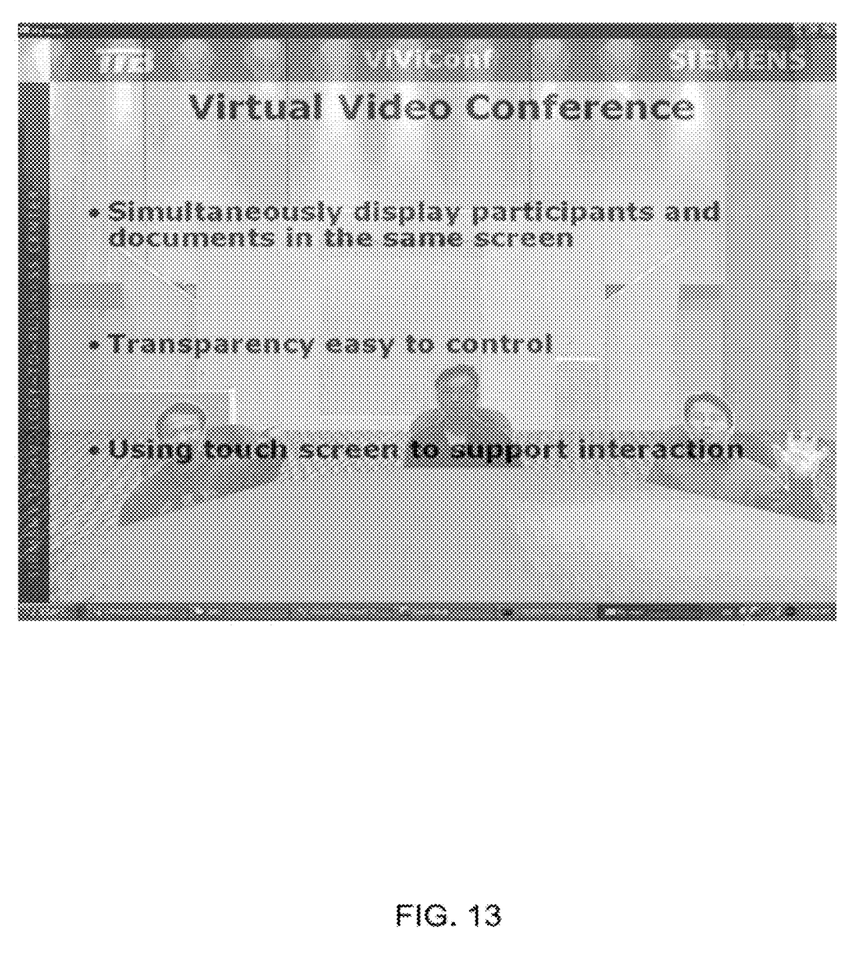
FIG. 13 illustrates a feature of a system according to some embodiments.

FIG. 13 displays a modified video signal including a semi-transparent media presentation. In conventional face-to-face meetings, documents are often projected onto a wall for all participants to view. As illustrated in FIG. 13, a document may be superimposed on any area of the image of the conference room so that all participants will be able to see the projected document.

A video conference participant may select the area of the conference room image on which the document is superimposed. For example, a slide presentation may be superimposed onto a table surface, or may be transparently superimposed (i.e., a semi-transparent presentation) as shown in FIG. 13 so that both the semi-transparent presentation and all video conference participants may be viewed simultaneously. In some embodiments, a level of transparency of the document may be adjusted based on the presentation and a level of transparency that is needed.

Figure 14:
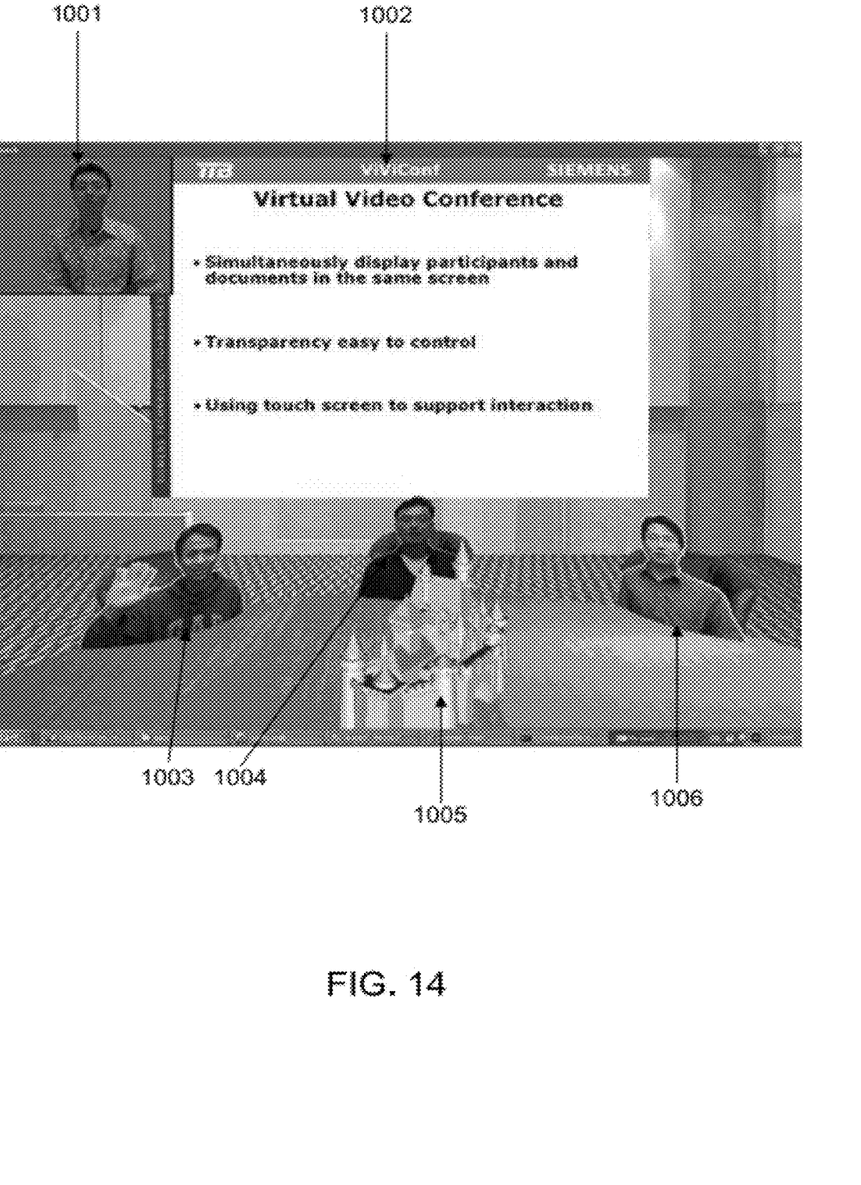
FIG. 14 illustrates a feature of a system according to some embodiments.

Now referring to FIG. 14, a plurality of video conferencing features are illustrated. A first video participant may have a perspective of the conference room as if he were actually sitting in the conference room. Thus, a modified video signal displayed by a first client may include images 1003/1004/1006 of other participants in a conference room. However, in some embodiments, such as for camera diagnostic and camera placement testing, the modified video signal displayed by the first client may include an image 1001 of the first video conference participant.

According to some embodiments, the modified video signal may be updated to simulate a changing perspective of a video conference participant as the video conference participant walks around the conference room. In this embodiment, a second modified video signal displayed to a second participant may show the first participant at an original static position in the conference room. However, in some embodiments, the second modified video signal is changed to simulate the first participant moving around the displayed conference room.

Figure 15:
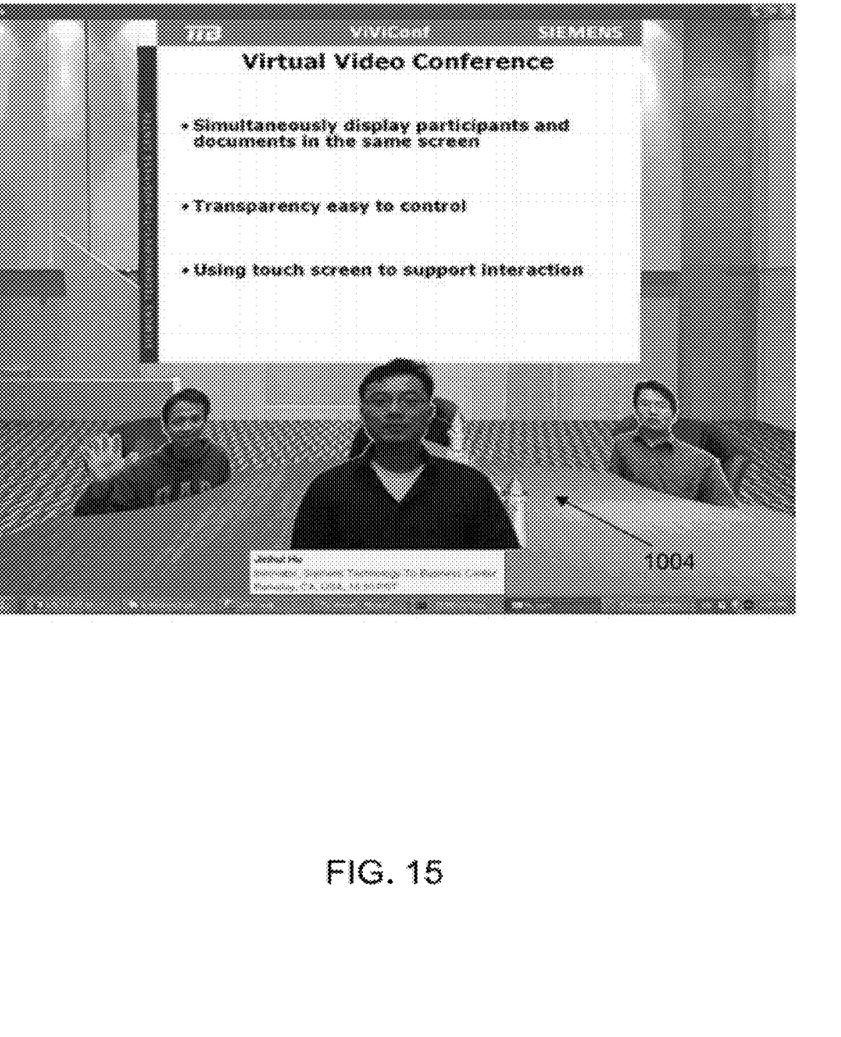
FIG. 15 illustrates a feature of a system according to some embodiments.

In some embodiments, an image of a specific participant, such as participant 1004 of FIG. 14 may be selected via a mouse or any known pointing mechanism. In response to selecting the image, the image may be enlarged and positioned at the front and center of the displayed modified video signal. For example, FIG. 15 reflects selection of the image of participant 1004 in some embodiments.

According to some embodiments, an algorithm may be implemented to detect audio channel energy levels associated with each participant to determine which participant is currently speaking. Based on this information, an associated image of a current speaker may be enlarged and positioned front and center of a display. In some embodiments, selecting an image of a participant may cause display of an identity, role, and/or affiliation of the participant. This displayed information may be extracted from a corporate directory, a local database, an email business card, or any known storage mechanism.

In some embodiments, a 3D Computer Aided Design (CAD) model may be combined with an image of a conference room. For example, a geographically distributed engineering team may meet in a virtual conference room to collaborate on a design. CAD model 1005 of FIG. 14 may be shared, distributed and displayed to all participants of a video conference. While the CAD model in the illustrated embodiment is positioned centrally on a surface of a table for all video participants to see, the CAD drawing may be rendered anywhere within the image of the conference room. The rendered CAD model may be rotated within the conference room, viewed as a wire frame, viewed as a cross-section and/or viewed as cut-a-ways. In some embodiments, a first video conference participant may control the CAD model so that each video conference participant views the CAD model from a same direction.

Figure 16:
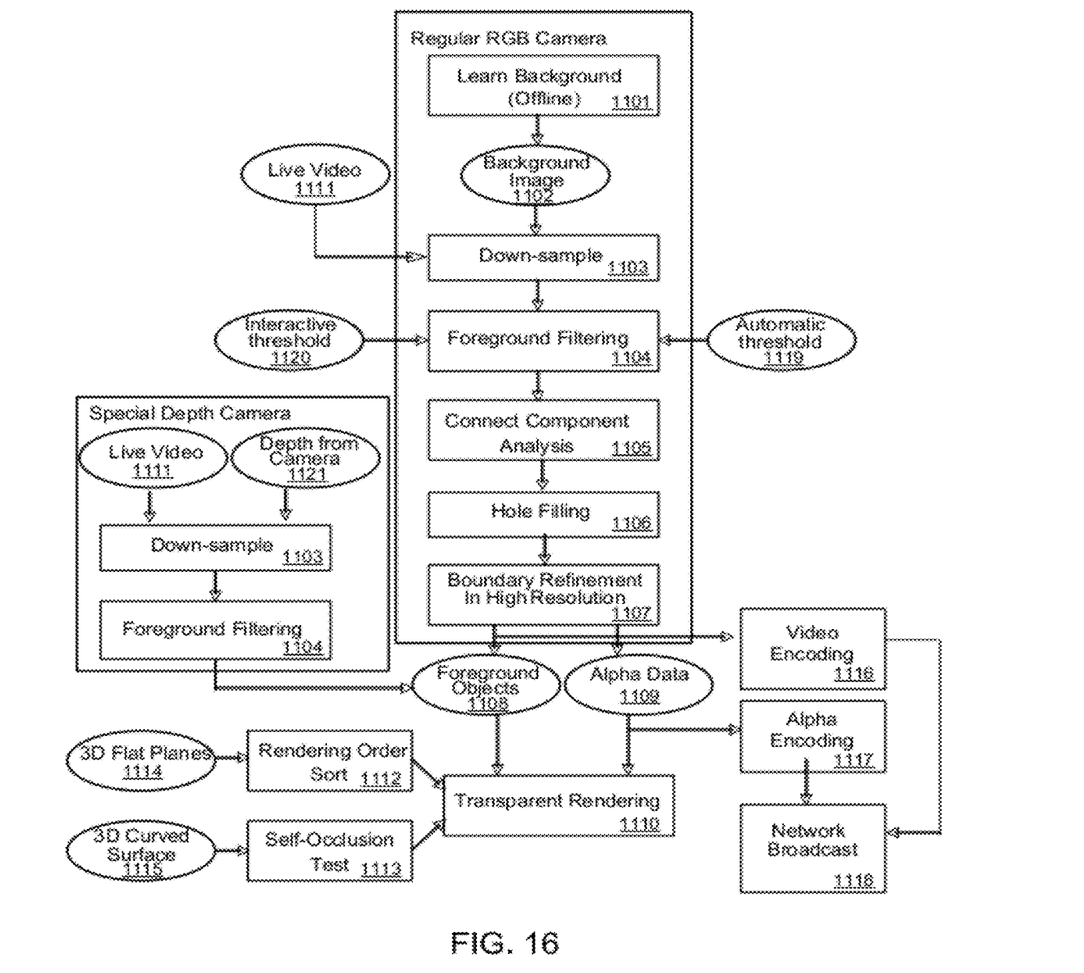
FIG. 16 is a block diagram of a system according to some embodiments.

Now referring to FIG. 16, a method 1100 is illustrated. In some embodiments, the method 1100 may define a video processing and rendering algorithm. In some embodiments, the method 1100 may apply to a red green blue ("RGB") camera and in some embodiments the method 1100 may apply to a special camera associated with color and depth data.

For a RGB camera, the method 1100 comprises learning a background 1101 using a pixel-based method. In order to detect one or more foreground objects 1108 and integrate the foreground objects 1108 into a virtual 3D environment, a background image must be identified and eventually subtracted. Background learning 1101 may comprise learning the background based on a sequence of images, and a medium method. The advantage of using a medium image (i.e. a solid colored image) as a background is that each pixel is an actual pixel from a training sequence, so no pseudo pixel may be introduced. In some embodiments, the learning process may require a sorting algorithm to find one or more medium pixels.

In some embodiments, when a stationary camera is used, a time averaging algorithm may be used to estimate the background image. For example, given a sequence of N frames, an average of the sequence of N frames is used to obtain the background image as shown in the following equation.

$$I_b = \frac{1}{N}\sum_{i=1}^{N} I_i$$

In some embodiments, and to improve memory efficiency, two image buffers may be employed to store the sequence of frames rather than storing the whole sequence of frames in a single buffer. The first buffer may store the background image, and the second buffer may store a current captured video frame. The first buffer (i.e., the background buffer) may be initialized to zero, and the background buffer may be averaged with the current captured video frame. In some embodiments if a background is changed or the camera is moved, a new background may be re-learned.

Next, at 1103 both live video frames 1111 and the learned background image 1102 are down-sampled 1103 (i.e., reducing the sampling rate) to speed up the process.

The foreground objects may be filtered (i.e. subtracted) at 1104 using a pixel-based method. A difference image may be computed using an absolute difference over each RGB channel between a current frame and a learned background image, and a neighbor window of the pixel may be used to compute the Sum of Squared Difference (SSD) (as illustrated in the following equation) over the window to improve the result.

$$SSD = \sum_{i,j \in D} (I_{video}(i, j) - I_{background}(i, j))^2$$

In some embodiments, if a window size is increased, a more accurate result will occur. However, since computing SSD over a large window may be time consuming, a window size of 3 by 3 may provide faster results than larger window sizes.

Foreground filtering 1104 may be based on an automatic threshold 1119. In some embodiments, a threshold to subtract the foreground objects from the background environment may comprise an automatic adaptive method. The automatic adaptive method may rely on an assumption that a video participant will substantially be in a middle of a camera's field of view. Therefore, a second assumption may be made that a left and right top corner will comprise a background image. Therefore, the SSD may be computed over the left and right top corner between a current frame and an estimated background image. The SSD value may be then scaled and used to filter other pixels in the current frame.

In some embodiments, an interactive threshold 1120 method may be employed to set a threshold. The interactive threshold 1120 method comprises setting a threshold to a default value, where the default value may be based on a histogram of a difference image between a current frame and the background image 1102. Each video participant may interactively adjust the threshold. For example, a video participant may decrease the threshold if foreground objects starts to disappear (false negative), or the video participant may increase the threshold if a live background starts to appear (false positive).

A connected component analysis (CCA) 1105 with a filtering process may eliminate false foreground objects. The CCA analysis may first initialize a stack with a seed pixel from a plurality of pixels classified as the foreground. Next, a top pixel may be popped from a stack and may be added to a current component, and then foreground neighbors associated with the current pixel may be pushed into the stack. This process may be repeated until the stack is empty. The result finds a whole component based on the seed pixel. This process may be repeated until all foreground pixels are visited. Next, each component may be filtered based on an area threshold and then, components determined to comprise a small area may be discarded. The CCA analysis may be summarized as follows: (1) Initialize a stack with a seed from the foreground pixels, (2) Pop a top pixel from the stack, add it to a current component, and set a visiting mark to 1, (3) Push all the foreground neighbors of the popped pixel into the stack, and set a visiting mark, (4) Repeat step 2 and 3 until the stack is empty, and (5) Repeat step 1 through 3 until all the foreground pixels are visited.

In some embodiments, some foreground objects may include holes where a hole may be foreground pixels that were incorrectly classified as background pixels. Holes in foreground objects 108 may be filled through a hole filling process 1106.

The CCA analysis may be used to fill holes except, that in this embodiment, the CCA may be conducted on background pixels. After the CCA analysis is performed on the background pixels, components with an area less than a user defined threshold may be set as foreground pixels. A video participant may dynamically adjust the area threshold to avoid some small background pixels being falsely set as foreground pixels.

The output of the background subtraction may comprise both the foreground objects 1108 and alpha data 1109. Boundaries of the foreground objects may be refined at 1107 and high-resolution images with refined boundaries may be encoded at 1116 and broadcast over a network at 1118. The high-resolution images may also be combined with other received images and alpha data 1109 for 3D rendering.

In some embodiments, a pyramid method may speed up video processing. The pyramid method comprises down-sampling both the background image and the current frame to low-resolution images. Background subtraction and CCA on the down-sampled image may be performed to speed up the image processing. If boundaries become blocky, then the blocky boundary may be refined using the high-resolution images.

In some embodiments a rectangular buffer may store the subtracted foreground image, and may be used for rendering and broadcasting to other remote users. To identify the foreground pixels from the non-foreground pixels in the rectangular buffer a pixel recognition mechanism may be used. In one embodiment the pixel recognition mechanism may set all the non-foreground pixels as a consistent color value, such as all zeros. In another embodiment, an alpha channel may be employed where an alpha value is set to 0 for background pixels and 1 for foreground pixels.

Since sending raw alpha data over the network may require a lot of bandwidth, the alpha data may be encoded 1117 before sending it over the network. The alpha encoding may comprise using only one bit for each pixel's alpha value, and combining a neighboring 8 bits into one byte. This may reduce the alpha data size to ⅛ of a raw data size. In some embodiments, since a background object and a foreground object may be connected, many bytes in a same row/column may have a same value. Furthermore each row/column may be scanned for same values and a count of the same values may be stored, which may further reduce a size of the data. A column scan may be employed since each row may have been divided by 8. The encoding algorithm may be summarized as follows: (1) Combine a neighboring 8 bits into one byte for each row (2) For each column, choose the first alpha byte data, and store it as a new value, increase its count by 1, (3) Scan the next alpha byte data, if it is the same, increase the count by 1. Otherwise, start a new value, and repeat 2 and 3, and (4) If the count reaches 256 (since only one byte is used to store the count) or it reaches the end of the column, start a new value, and repeat 2 and 3. For example an image of resolution 640 by 480, may comprise a post-encoding size of less than 1 K, which may provide an encoding ratio of 40:1.

At 1110 the subtracted foreground images may be texture mapped onto a 3D plane. In some embodiments, the mapping may utilize an OpenGL alpha blending feature to render the background pixels as transparent. Initially, a received video frame and the alpha data may be decoded and the two data are combined into one RGBA image data. An alpha blending feature may be enabled and a transparency may be set according to the alpha value. Based on an alpha channel, OpenGL may automatically render background pixels as transparent, leaving only the foreground pixels non-transparent. This may provide an illusion that a video participant is meeting in a shared 3D space.

Figure 17:
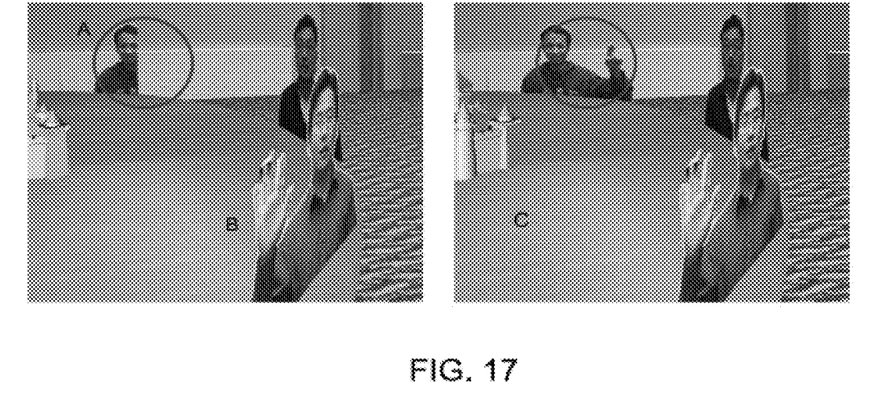
FIG. 17 illustrates a virtual conference room according to some embodiments.

At 1112, a rendering order may be created. A rendering order may be associated with an associated depth value of each video participant. As illustrated in FIG. 17, part of user A is occluded by user B. Although the background pixels of the 3D plane for user B are transparent, they still have depth value. Since the depth value of user B is smaller than that of the user A, if plane B is rendered first, part of plane A will not pass the depth test. Hence user A may appear partially occluded. To solve this problem, all 3D planes are initially sorted according to a distance associated with an eye view point. The 3D planes are then rendered in a descending order based on depth to produce a result such as user C. In some embodiments the order may be dynamically updated the whenever a viewpoint is changed.

Figure 18:
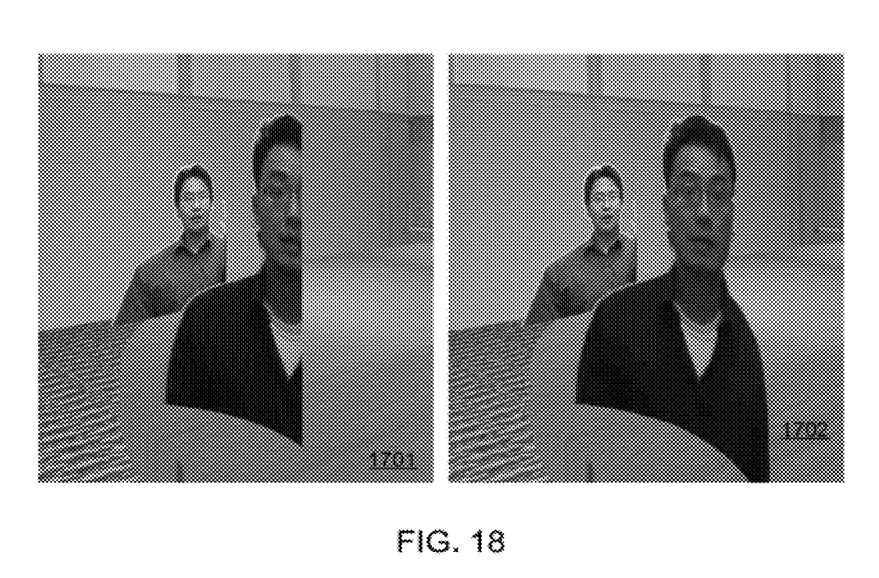
FIG. 18 illustrates a virtual conference room according to some embodiments.

As stated previously, a live image may be projected onto a curved 3D surface 1115 or a flat 3D surface 1114. However, rendering a curved surface with transparent texture mapping may have an occlusion problem similar to that of rendering multiple transparent 3D planes. This may be caused by self-occlusion of different parts of the curved surface as illustrated at 1701 in FIG. 17. To solve this problem, a self-occlusion test 1113 may be used. A cylindrical surface may be divided into many segments along a latitude direction. The segments may then be sorted according to their depth associated with an eye view point, and then the segments are rendered in a descending order as illustrated at 1702 of FIG. 18. The order may be dynamically updated whenever a viewpoint is changed.

For special cameras with color and depth data, a background learning process 1101 may not be required. Since depth data 1121 is low-resolution, high-resolution color data from a live video signal 111 may be down-sampled 1103 to a same resolution as the depth data 1121, and foreground objects 1108 may be extracted through foreground filtering 1104 as described previously.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
   receiving a first video signal at a first client, the first video signal comprising an image of a first person;
   receiving a second video signal at a second client, the second video signal comprising an image of a second person; combining the received first video signal and an image of a conference room at the first client to create a first modified video signal comprising the image of the first person in the conference room; and
   combining the received second video signal and the image of the conference room at the second client to create a second modified video signal comprising the image of the second person in the conference room; and
   wherein the first client further receives a third video signal comprising an image of a third person, and wherein combining the received first video signal, the received third video signal and an image of a conference room at the first client creates a third modified video signal comprising the image of the first person and an image of the third person in the conference room.

2. The method of claim 1, further comprising:
   modifying the first modified video signal to change a perspective associated with the first modified video signal.

3. The method of claim 2, wherein the first modified video signal comprises an image of the third person and does not comprise an image of the second person.

4. The method of claim 1 wherein at least one of the first client and the second client comprises a laptop computer.

5. A system comprising:
   a first client device to:
      receive a first video signal, the first video signal comprising an image of a first person; and
      combine the received first video signal and an image of a conference room to create a first modified video signal comprising the image of the first person in the conference room; and
   a second client device to:
      receive a second video signal, the second video signal comprising an image of a second person; combining the received second video signal and the image of the conference room to create a second modified video signal comprising the image of the second person in the conference room; and
   wherein the first client device is to further receive a third video signal comprising an image of a third person, and wherein combining the received first video signal, the received third video signal and an image of a conference room at the first client creates a third modified video signal comprising the image of the first person and an image of the third person in the conference room.

6. The system of claim 5, further comprising:
   modifying the first modified video signal to change a perspective associated with the first modified video signal, wherein the modified first modified video signal comprises an image of the third person and does not comprise an image of the second person.

* * * * *